United States Patent
Coalson

(10) Patent No.: US 9,530,094 B2
(45) Date of Patent: Dec. 27, 2016

(54) JABBA-TYPE CONTEXTUAL TAGGER

(71) Applicant: Yahoo! Inc., Sunnyvale, CA (US)

(72) Inventor: Josh Coalson, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 397 days.

(21) Appl. No.: 13/843,666

(22) Filed: Mar. 15, 2013

(65) Prior Publication Data

US 2014/0279804 A1    Sep. 18, 2014

(51) Int. Cl.
*G06N 5/02* (2006.01)

(52) U.S. Cl.
CPC ........................ *G06N 5/02* (2013.01)

(58) Field of Classification Search
None
See application file for complete search history.

(56) References Cited

U.S. PATENT DOCUMENTS

| | | | |
|---|---|---|---|
| 5,610,812 A * | 3/1997 | Schabes et al. ............ | 704/9 |
| 6,910,004 B2 * | 6/2005 | Tarbouriech et al. ...... | 704/9 |
| 7,702,508 B2 | 4/2010 | Bennett | |
| 8,473,442 B1 * | 6/2013 | Deninger et al. .......... | 706/47 |
| 9,195,940 B2 | 11/2015 | Coalson et al. | |
| 9,262,555 B2 | 2/2016 | Coalson et al. | |
| 2003/0187633 A1 | 10/2003 | Fairweather | |
| 2005/0283507 A1 | 12/2005 | Souvignier et al. | |
| 2007/0271255 A1 | 11/2007 | Pappo | |
| 2008/0114738 A1 | 5/2008 | Chao | |
| 2009/0182644 A1 * | 7/2009 | Panagopulos et al. ..... | 705/26 |
| 2011/0173174 A1 | 7/2011 | Flitcroft | |
| 2014/0279743 A1 | 9/2014 | Coalson | |
| 2014/0279804 A1 | 9/2014 | Coalson | |
| 2014/0280358 A1 | 9/2014 | Coalson et al. | |
| 2014/0282393 A1 | 9/2014 | Coalson | |

OTHER PUBLICATIONS

"Nuance GSL Grammar Format". Aug. 23, 2011. <retrieved Feb. 11, 2016>. <retrieved from cafe.bevocal.com>.*
U.S. Appl. No. 13/842,826, filed Mar. 15, 2013, 80 pages.
U.S. Appl. No. 13/842,826: Filing Receipt, mailed May 10, 2013, 3 pages.
U.S. Appl. No. 13/842,826: Notice to File Missing Parts, mailed May 10, 2013, 2 pages.
U.S. Appl. No. 13/842,826: Response to Pre-Exam Formalities Notice, filed Jun. 20, 2013, 3 pages.
U.S. Appl. No. 13/842,826: Filing Receipt, mailed Jul. 2, 2013, 3 pages.
U.S. Appl. No. 13/842,826: Notice of Publication, mailed Sep. 18, 2014.
U.S. Appl. No. 13/843,292, filed Mar. 15, 2013, 48 pages.
U.S. Appl. No. 113/843,292: Filing Receipt, mailed May 13, 2013, 3 pages.

(Continued)

*Primary Examiner* — Kakali Chaki
*Assistant Examiner* — Eric Nilsson
(74) *Attorney, Agent, or Firm* — Berkeley Law & Technology Group, LLP

(57) ABSTRACT

Example methods, apparatuses, or articles of manufacture are disclosed that may be implemented, in whole or in part, using one or more computing devices to facilitate or otherwise support one or more processes or operations for a Jabba-type contextual tagger.

19 Claims, 3 Drawing Sheets

(56) References Cited

OTHER PUBLICATIONS

U.S. Appl. No. 13/843,292: Notice to File Missing Parts, mailed May 13, 2013, 2 pages.
U.S. Appl. No. 13/843,292: Authorization for extension of time, mailed Jun. 24, 2013, 3 pages.
U.S. Appl. No. 13/843,292: Response to Pre-Exam Formalities Notice, filed Jun. 24, 2013, 4 pages.
U.S. Appl. No. 13/843,292: Filing Receipt, mailed Jul. 3, 2013, 3 pages.
U.S. Appl. No. 13/843,292: Notice of Publication, mailed Sep. 18, 2014.
U.S. Appl. No. 13/843,292: Examiner's Search Strategy and Results, mailed Nov. 5, 2014, 3 pages.
U.S. Appl. No. 13/843,292: Non-Final Rejection, mailed Nov. 5, 2014, 10 pages.
U.S. Appl. No. 13/842,826: Non-Final Rejection and Examiner's Search Strategy, mailed Mar. 20, 2015, 21 pages.
U.S. Appl. No. 13/843,292: Amendment/Req Reconsideration After Non-Final Rejection, filed Feb. 5, 2015, 11 pages.
U.S. Appl. No. 13/843,292: Final Rejection and Examiner's Search Strategy, mailed Mar. 19, 2015, 16 pages.
U.S. Appl. No. 13/842,826: Amendment/Req Reconsideration After Non-Final Rejection, filed Jun. 22, 2015, 16 pages.
U.S. Appl. No. 13/842,826: Final Rejection, mailed Jul. 20, 2015, 25 pages.
U.S. Appl. No. 13/843,292: Response After Final Action and Amendments, filed Jun. 19, 2015, 11 pages.
U.S. Appl. No. 13/843,292: Advisory Action and Amendment, mailed Jul. 1, 2015, 4 pages.
U.S. Appl. No. 13/843,292: Request for Continued Examination and Amendments, filed Jul. 20, 2015, 15 pages.
U.S. Appl. No. 13/844,013: Amendment/Req Reconsideration After Non-Final Rejection and Amendments, filed Jul. 24, 2015, 9 pages.
U.S. Appl. No. 13/842,826: Response After Final Action and Amendments, Sep. 18, 2015, 18 pages.
U.S. Appl. No. 13/842,826: Advisory Action, Oct. 5, 2015, 5 pages.
U.S. Appl. No. 13/842,826: RCE and Amendments, Oct. 19, 2015, 19 pages.
U.S. Appl. No. 13/842,826: Notice of Allowance and Fees, Dec. 14, 2015, 9 pages.
U.S. Appl. No. 13/842,826: Issue Fee Payment, Mar. 1, 2016, 1 page.
U.S. Appl. No. 13/843,292: Non-Final Rejection, Aug. 5, 2015, 14 pages.
U.S. Appl. No. 13/843,292: Amendment/Req. Reconsideration After Non-Final Rejection, Sep. 21, 2015, 15 pages.
U.S. Appl. No. 13/843,292: Notice of Allowance and Fees, Oct. 14, 2015, 10 pages.
U.S. Appl. No. 13/843,292: Issue Fee Payment, Jan. 11, 2016, 1 page.
U.S. Appl. No. 13/843,292: Issue Notification, Jan. 27, 2016, 1 page.
U.S. Appl. No. 13/844,013: Notice of Allowance and Fees Due, Aug. 12, 2015, 5 pages.
U.S. Appl. No. 13/844,013: Issue Fee Payment, Oct. 16, 2015, 1 page.
U.S. Appl. No. 13/844,013: Issue Notification, Nov. 4, 2015, 1 page.

* cited by examiner

JABBA-TYPE CONTEXTUAL TAGGER

BACKGROUND

1. Field

The present disclosure relates generally to search engine content management systems, and, more particularly, to a Jabba-type contextual tagger for use in or with search engine content management systems.

2. Information

The Internet is widespread. The World Wide Web or simply the Web, provided by the Internet, is growing rapidly, at least in part, from the large amount of content being added seemingly on a daily basis. A wide variety of content, such as one or more electronic documents, for example, is continually being identified, located, retrieved, accumulated, stored, or communicated. Various information databases including, for example, knowledge bases or other collections of content, Web-based or otherwise, have become commonplace, as have related communication networks or computing resources that help users to access relevant information. Effectively or efficiently identifying or locating content of interest may facilitate or support information-seeking behavior of users and may lead to an increased usability of a search engine.

With a large amount of content being available, a number of tools may often be provided to allow for copious amounts of information to be searched through in an efficient or effective manner. For example, service providers may allow users to search the Web or other networks, databases or other data repositories, etc. using search engines. In some instances, a search engine may, for example, utilize one or more sequence or like taggers, such as a Hidden Markov Model (HMM), Conditional Random Fields (CRF), or the like to facilitate or support locating relevant content. At times, however, sequence or like taggers may require machine learning from a statistically sufficient amount of training data, for example, which may be labor-intensive. In addition, an output of a sequence or like tagger may be the result of a statistical process employing certain approximations or assumptions, such as with respect to sequence distributions, for example, which may be computationally-expensive or otherwise error-prone. A dictionary-type tagging may be less ambiguous, but may label words or phrases corresponding to a search query regardless of its context, however.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

Figure 1:
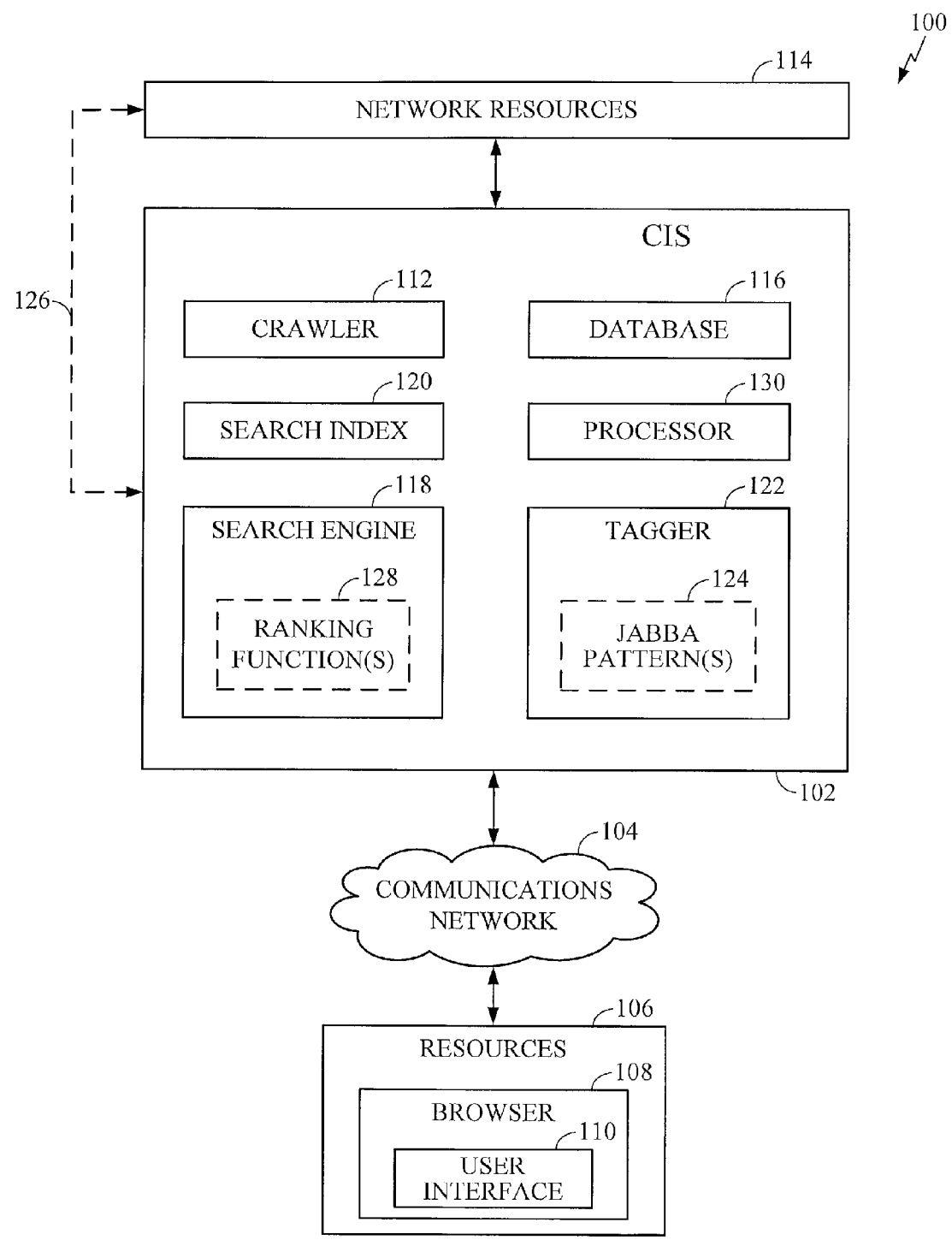
FIG. 1 is a schematic diagram illustrating certain features of an implementation of an example computing environment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be used, in whole or in part, to facilitate or support one or more processes or operations for a Jabba-type contextual tagger, such as in connection with Jabba language, for example. Briefly, Jabba is a novel language for matching or generating sequences of text, such as structured text, for example, as well as for associating actions to one or more match events. For purposes of explanation, somewhat similarly to how regular expressions (RE) match sequences of characters or specify actions (e.g., store matched segments in pattern buffers, etc.), Jabba language or "Jabba" may be used, at least in part, to match sequences of atoms as well as associate relatively complex actions with one or more suitable match processes. As used herein, "Jabba atoms" or simply "atoms" may be used interchangeably and may refer to one or more text fragments that may be classified or tagged, such as via a Jabba-type contextual tagger, for example, with one or more attributes. An atom may comprise, for example, a structured text fragment, such as a string of text, a class that may also be represented via a string (e.g., "place_name," etc.), a set of key-value attributes (e.g., "place_type"="city", "is_unique"=false, etc.), or any combination thereof. As illustrated, in some instances, an attribute may comprise, for example, a string key associated with a JavaScript Object Notation (JSON) value, though claimed subject matter is not so limited.

Depending on an implementation, a Jabba rule may, for example, be built up or created from a Boolean match expression that may facilitate or support matching one or more aspects of a candidate atom. For ease of understanding, a Jabba atom may be conceptually thought of as a structural equivalent of a character in RE, and a Jabba rule may be thought of as a named equivalent of an RE pattern. Likewise, Jabba match expressions may, for example, be conceptualized as characters or character classes in RE patterns, for example, except that Jabba match expressions may comprise arbitrary Boolean functions on different parts of a candidate atom. As a way of illustration, the search query "London pictures" may be tokenized via one or more appropriate techniques, processed via a suitable entity recognizer, and broken into a sequence of two Jabba atoms as, for example:

"london" class="place"
    attributes={"type":"city","unique":false}
"pictures" class="token" attributes={ }

Jabba actions may, for example, cause callbacks to a client to be invoked. For example, one or more callbacks may be specified via Jabba to map one or more Jabba actions into application-specific functionality. If a match is found, for example, a client may receive a callback comprising a name of a Jabba rule that matched as well as all triggered actions. Although claimed subject matter is not necessarily limited in scope in this respect, additional example embodiments or techniques that may be used, at least in part, to match sequences of atoms and associate actions with various match processes via Jabba language (along with related technology) may be discussed in concurrently filed U.S. patent application Ser. No. 13/842,826, titled "JABBA LAN- GUAGE," filed on Mar. 15, 2013, by Coalson, herein incorporated by reference in its entirety and assigned to the assignee of currently claimed subject matter.

As alluded to previously, rich or otherwise sufficient matching or action semantics may allow Jabba to be advantageously integrated into a number of text processing or modeling applications, which may include, for example, a Jabba-type contextual tagger. As used herein, "Jabba-type contextual tagger," "contextual tagger," or simply "tagger" may be used interchangeably and may refer to one or more processes or operations capable of identifying of one or more words, symbols, or other linguistic characters, or any combination thereof in text, such as structured text, for example, as corresponding to a search query or like text input. As will be described in greater detail below, a Jabba-type contextual tagger may label one or more parts of a search query or like text input, for example, while taking other one or more parts of the query, etc. into account. As was indicated, in some instances, a Jabba-type contextual tagger may, for example, be used, at least in part, in connection with an on-line search performed via a suitable search engine. As used herein, "on-line" may refer to a type of a communication that may be implemented electronically via one or more communications networks, such as, for example, the Internet, an intranet, a communication device network, or the like. Communications networks may comprise, for example, a wireless network, wired network, or any combination thereof.

Briefly, a search engine may typically comprise a computing platform that may, for example, help a user to locate, retrieve, match, etc. content of interest. In some instances, content may include, for example, on-line content, such as one or more web documents of a particular interest. As used herein, "web document" or "electronic document" may be used interchangeably and may refer to one or more digital signals, such as communicated or stored signals, for example, representing a source code, text, image, audio, video file, or the like. As a way of illustration, web documents may include a web page, a news feed, a rating or review post, a status update, a portal, a blog, an e-mail, a text message, an Extensible Markup Language (XML) document, a web page pointed to by a Uniform Resource Locator (URL), a collection of user-generated content, etc., just to name a few examples. At times, web documents may include one or more embedded references or hyperlinks to images, audio or video files, or other web documents. One common type of reference may comprise, for example, a URL.

In some instances, text patterns associated with web documents may, for example, be matched to a search query or like text input via one or more processing operations in connection with a suitable search engine, such as an on-line search engine, pattern-matching search engine, etc., or any combination thereof. For example, a search engine may interpret one or more provided syntax rules and may perform one or more matching operations with respect to a target character string, buffer, file, web document, etc. Search results of one or more matching operations may comprise, for example, one or more web documents presented to a user (e.g., via a graphical user interface) in an ascending or descending order of relevance. In some instances, search results may comprise, for example, one or more "match" or "no-match" values representative of respective "found" or "not found" Boolean results. Of course, these are merely details relating to search engines and claimed subject matter is not so limited.

As alluded to previously, at times, typical sequence taggers, such as HMM, CRF, or the like may require a statistically sufficient amount of training data, for example, and their outputs may be the result of a relatively complex statistical process. Again, this may be time-consuming or computationally-expensive. Accordingly, it may be desirable to develop one or more methods, systems, or apparatuses that may implement a more effective or efficient contextual tagger, such as with little or no machine learning from training data, for example.

Thus, as described below, one or more suitable parts of a search query or like text input may, for example, be labeled via a Jabba-type contextual tagger while taking other one or more parts of the search query or like text input into account. In at least one implementation, one or more labeled sequences may, for example, be defined via one or more suitable Jabba patterns. One or more slot names may, for example, be utilized, at least in part, to generate one or more labels or tags, as will also be seen. As used herein, "label" or "tag" may be used interchangeably and may refer to one or more identifying terms descriptive of an electronic document or a portion thereof that may enable locating such a document or portion in response to a search query or like text input. For example, a label or tag may comprise one or more words, characters, symbols, etc. identifying a location of an electronic document or portion thereof within a search index, just to illustrate one possible implementation. Since a Jabba-type contextual tagger may, for example, be capable of defining labeled sequences directly via Jabba patterns, machine learning from training data may not be needed or otherwise useful. Providing a mechanism in which a number of known sequences may be precisely labeled using concise Jabba patterns may also improve or otherwise complement statistical taggers, for example. In addition, because an entire sequence may be specified via one or more Jabba rules, labels are typically, although not necessarily, contextual, meaning that labels may, for example, be applied if an entire sequence matches.

FIG. 1 is a schematic diagram illustrating certain features of an implementation of an example computing environment 100 capable of facilitating or supporting one or more processes or operations for a Jabba-type contextual tagger. As will be seen, one or more processes or operations may be performed in connection with a tagging scheme, such as a mechanism that may be employed electronically, in whole or in part, to generate one or more labels with respect to one or more sequences of candidate atoms without utilizing one or more machine-learned models, for example. Computing environment 100 may be operatively enabled using one or more special purpose computing apparatuses, communication devices, storage devices, computer-readable media, applications or instructions, various electrical or electronic circuitry, components, etc., as described herein with reference to example implementations.

As illustrated, computing environment 100 may include one or more special purpose computing platforms, such as, for example, a Content Integration System (CIS) 102 that may be operatively coupled to a communications network 104 that a user may employ to communicate with CIS 102 by utilizing resources 106. CIS 102 may be implemented in connection with one or more public networks (e.g., the Internet, etc.), private networks (e.g., intranets, etc.), public or private search engines, Real Simple Syndication (RSS) or Atom Syndication (Atom)-type applications, etc., just to name a few examples.

Resources 106 may comprise, for example, one or more special purpose computing client devices, such as a desktop computer, laptop computer, cellular telephone, smart telephone, personal digital assistant, or the like capable of communicating with or otherwise having access to the Internet via a wired or wireless communications network. Resources 106 may include a browser 108 and a user interface 110, such as a graphical user interface (GUI), for example, that may, for example, initiate transmission of a search query or like text input represented via one or more electrical digital signals. User interface 110 may interoperate with any suitable input device (e.g., keyboard, mouse, touch screen, digitizing stylus, etc.) or output device (e.g., display, speakers, etc.) for interaction with resources 106. Even though a certain number of resources 106 are illustrated, it should be appreciated that any number of resources may be operatively coupled to CIS 102, such as via communications network 104, for example.

In an implementation, CIS 102 may employ a crawler 112 to access network resources 114 that may include suitable content of any one of a host of possible forms (e.g., web pages, search query logs, status updates, location check-ins, audio, video, image, structured or unstructured text files, etc.), such as in the form of stored or communicated binary digital signals, for example. Crawler 112 may store all or part of a located web document (e.g., a URL, link, etc.) in a database 116, for example. CIS 102 may further include a search engine 118 supported by a suitable index, such as a search index 120, for example, and operatively enabled to search for content obtained via network resources 114. Search engine 118 may, for example, communicate with user interface 110 and may retrieve for display via resources 106 a listing of search results via accessing, for example, network resources 114, database 116, search index 120, etc., such as in response to a search query or like text input. Network resources 114 may include suitable content, as was indicated, such as represented by stored digital signals, for example, accessible via the Internet, one or more intranets, or the like. For example, network resources 114 may comprise one or more web pages, web portals, status updates, electronic messages, databases, or like collection of stored electronic information.

CIS 102 may further include a tagger, such as a Jabba-type contextual tagger, for example, as referenced generally at 122. As alluded to previously, tagger 122 may label one or more parts of a search query or like text input, for example, while taking other one or more parts of the search query or like text input into account. Tagger 122 may, for example, utilize one or more Jabba patterns 124 that may directly specify a suitable or desired sequence of candidate atoms to be matched to a search query or like text input, as described below. This may eliminate or reduce ambiguity inherent in machine learning, since knowledge may be introduced directly, such as via a less ambiguous Jabba pattern, for example, rather than inferred or imputed indirectly via learning assumptions or approximations. In some instances, labeling one or more parts of a search query or like text input may, for example, be performed during one or more indexing or crawling operations using one or more appropriate techniques, though claimed subject matter is not so limited. For example, optionally or alternatively, one or more Jabba patterns 124 may be compiled into a suitable state machine associated with computing environment 100, such as a nondeterministic finite automaton (NDFA), just to illustrate one possible implementation. In some instances, a state machine may comprise a sequence recognizer making callbacks for each match, for example, with all the match actions. Tagger 122 may create a sequence of tags with one or more names taken from Jabba slot names of a match result, for example, and may add one or more tag attributes for each general assignment, as will also be seen. Particular examples of Jabba-type contextual tagging, slot names, as well as general assignments will be described in greater detail below with reference to FIG. 2.

At times, it may be potentially advantageous to utilize one or more real-time or near real-time indexing or searching techniques, for example, so as to keep a suitable index (e.g., search index 120, database 116, etc.) sufficiently updated. In this context, "real time" may refer to an amount of timeliness of content, which may have been delayed by, for example, an amount of time attributable to electronic communication as well as other signal processing. For example, CIS 102 may be capable of subscribing to one or more social networking platforms, news feeds, location check-in services, or other content, on-line or otherwise, via a content feed 126. In some instances, content feed 132 may comprise, for example, a live feed, though claimed subject matter is not so limited. As such, CIS 102 may, for example, be capable of receiving streaming, periodic, or asynchronous updates via a suitable application programming interface (API) associated with network resources 114. In some implementations, network resources 114 may include a suitable pattern-matching library (e.g., C++, etc.), which may provide an API for compiling Jabba patterns 124 into a suitable state machine, as was indicated. Again, claimed subject matter is not limited in this regard.

As previously mentioned, in some instances, it may be desirable to rank retrieved web documents so as to assist in presenting relevant or useful content, such as one or more electronic documents of interest, for example, in response to a search query or like text input. Accordingly, CIS 102 may employ one or more ranking functions 128 that may rank search results in a particular order that may be based, at least in part, on keyword, relevance, recency, usefulness, popularity, or the like including any combination thereof. In some instances, ranking functions 128 may, for example, facilitate or support obtaining or providing one or more "match" or "no-match" values representative of respective "found" or "not found" Boolean results, as was also indicated. As seen, CIS 102 may further include a processor 130 that may, for example, be capable of executing computer-readable code or instructions, implement suitable operations or processes, etc. associated with example environment 100.

As a way of illustration, in operative use, a user may access a search engine website, such as www.yahoo.com, for example, and may submit or input a search query by utilizing resources 106. Browser 108 may initiate communication of one or more electrical digital signals representing a search query from resources 106 to CIS 102, such as via communications network 104, for example. CIS 102 may, for example, look up search index 120 and may establish a listing of web documents relevant to a search query based, at least in part, on tagger 122, ranking function(s) 128, database 116, or the like. CIS 102 may further communicate search results to resources 106, such as for displaying via user interface 110, for example.

Figure 2:
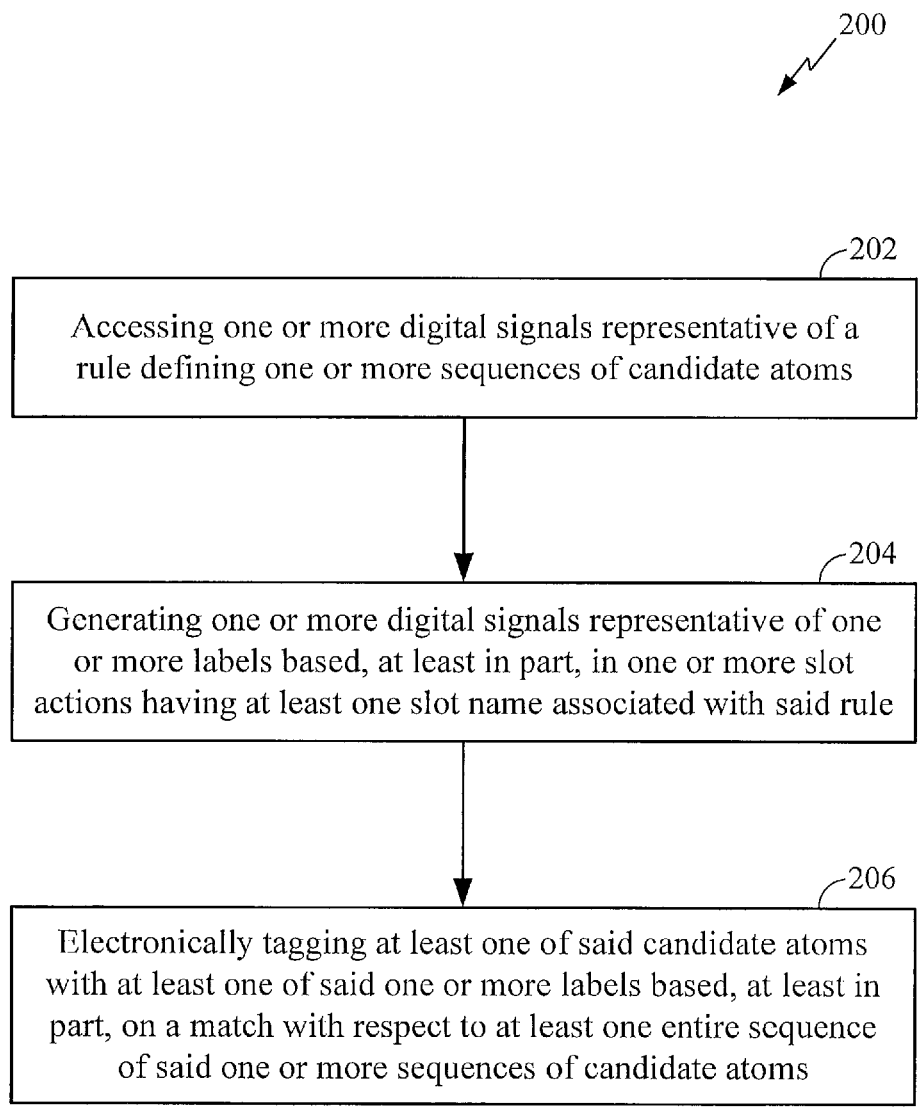
FIG. 2 is a schematic representation of a flow diagram illustrating a summary of an implementation of an example process for a Jabba-type contextual tagger.

FIG. 2 is a schematic representation of a flow diagram illustrating a summary of an implementation of an example process 200 that may facilitate or support one or more operations or techniques for a Jabba-type contextual tagger. As was indicated, one or more operations or techniques of process 200 may comprise a tagging scheme capable of generating one or more labels with respect to one or more sequences of candidate atoms, such as without utilizing one or more machine-learned models, for example. It should be noted that electronic information applied or produced, such as, for example, inputs or results associated with process 200 may be represented via one or more digital signals. It should also be appreciated that even though operations are illustrated or described concurrently or with respect to a certain sequence, other sequences or concurrent operations may also be employed. In addition, although the description below references particular aspects or features illustrated in certain other figures, one or more operations may be performed with other aspects or features.

In an implementation, to facilitate one or more operations or techniques of process 200, the following conventions with respect to Jabba and a Jabba-type contextual tagger may, for example, be employed or otherwise considered, in whole or in part.

An atom may comprise, for example, the smallest unit of meaning that may be labeled. As was indicated, in this context, an atom may refer to a text fragment that may be classified or tagged with one or more attributes. For example, a word of a search query rather than a letter may comprise or be considered an atom since typically, although not necessarily, words may convey meaning better than letters. Claimed subject matter is not limited to such an observation, of course. For example, in some instances, a suitable symbol or character may comprise or be considered an atom if appropriate meaning may be sufficiently conveyed via such a symbol or character.

A Jabba rule may, for example, define all possible sequences with a given labeling. As used herein, a Jabba rule may refer to one or more named terms. In some instances, a Jabba rule may, for example, identify an overall meaning for an interpretation and create slots for relevant parts of the interpretation to serve as pointers for a consumer of the interpretation to work back to original spans of interest that contribute to that meaning. As a way of illustration, at times, a Jabba rule may be represented via, for example, a name on the left hand side and a match term on the right, terminated by a semicolon or:

image=.;

Here, the simplest term may comprise a single match expression, such as a dot, for example, which may match any atom, somewhat similarly to matching any character in RE. Each match expression may, for example, match more atoms, in which case the counting character * may, for example, be used. Thus, consider:

image=.*;

Again, additional non-limiting examples of Jabba rules (along with related technology) may be discussed in concurrently filed U.S. patent application Ser. No. 13/842,826, titled "JABBA LANGUAGE," filed on Mar. 15, 2013, by Coalson, herein incorporated by reference in its entirety and assigned to the assignee of currently claimed subject matter.

Jabba slot actions may, for example, generate a label with a given slot name corresponding to a subset of atoms in an input matched by a term. For example, for each part of a Jabba pattern that matches, one or more slot actions may be assigned to facilitate or support generating a label with a given slot name. For ease of understanding, Jabba slot actions may, for example, have some semantic similarity to GSL slots, though claimed subject matter is not so limited, of course.

Jabba general assignments may, for example, provide one or more finer-grained attributes to a label. A general assignment may comprise, for example, a type of action that may allow assigning one or more arbitrary key-value pairs in a domain object. A general assignment may, for example, facilitate or support associating arbitrary key-value pairs in one or more match actions. General assignments may be represented via an equals sign as, for example:

person=<person_name>'name:$^;type="unknown"';

This action sequence may, for example, create a name slot and a general assignment of "unknown" to the type key. Providing finer-grained attributes, such as via associating additional metadata with a label, for example, may be useful for determining contexts of relatively ambiguous search queries (e.g., "Chicago pizza," etc.), as will also be seen. The above conventions as well as how one or more Jabba elements may correspond to a tagging process, such as via a Jabba-type contextual tagger, for example, will be better understood in connection with one or more operations or techniques of example process 200 described below.

Thus, at operation 202, one or more digital signals representative of a rule defining one or more sequences of candidate atoms may, for example, be accessed. As was indicated, a rule may be defined via one or more Jabba patterns specifying how one or more sequences of candidate atoms may be labeled, for example. A Jabba rule may be stored as one or more digital signals in a suitable memory or like data repository (e.g., as Jabba patterns 124 of FIG. 1, etc.) that may be accessed by a suitable process, such as process 200 or like process associated with a Jabba-type contextual tagger, for example. By way of example but not limitation, the following Jabba rule may be used, at least in part, to specify how some sequences of candidate atoms may be labeled in a "product" context:

```
ipod_product = ¯{
    [ ipod iPod i-pod ]#product
    [ nano Nano ]#model
    [ 4GB 8GB 16GB ]?#capacity
    [ sale {for sale} ]?
};
```

As was indicated, this or like rule may be accessed by a suitable process, for example, to facilitate or support matching a sequence of candidate atoms, such as directly via one or more actual strict matches. This may eliminate or reduce ambiguity of machine learning, for example, and may provide a context for more effective or efficient labeling of candidate atoms, such as directly via Jabba patterns, as was indicated. It should be noted that in some instances a sequence of candidate atoms may comprise, for example, an unordered sequence associated with a search query or like text input, just to illustrate one possible implementation.

With regard to operation 204, one or more digital signals representative of one or more labels may, for example, be generated based, at least in part, on one or more slot actions having at least one slot name associated with a rule. Continuing with the above example, the specified Jabba rule may, for example, match the query "16 GB ipod nano for sale" with at least three slot actions facilitating or supporting the following labeling:

16 GB→capacity
ipod→product
nano→model

As illustrated via the Jabba pattern, for each of these matches (e.g., 16 GB, ipod, nano, etc.), a Jabba slot notation "#", such as in slots "#product" or "#model" etc. may, for example, be employed. This may cause one or more callbacks with a respective action sequence to be invoked, as previously mentioned. For this example, based, at least in part, on a potential match with respective parts or fragments of the above search query (e.g., candidate atoms), Jabba may implement a callback for the slot "product," and a label with the given slot name "product" may, for example, be generated. Likewise, callbacks with respect to slots "model,"

"capacity," and "for sale" may, for example, be implemented, and respective labels with these given slot names may, for example, be generated using similar techniques. It should be noted that generating a label with respect to the "for sale" or simply "sale" slot may be optional in certain implementations. Of course, these are merely details relating to generating a label via one or more Jabba slot actions, and claimed subject matter is not so limited.

At operation 206, at least one of these one or more candidate atoms may, for example, be electronically tagged with at least one of these one or more labels based, at least in part, on a match with respect to at least one entire sequence of one or more sequences of candidate atoms. As previously mentioned, a concise Jabba pattern may specify the entire sequence of candidate atoms to be matched, for example, which may provide a context for more effective or efficient tagging, such as if the entire sequence of candidate atoms matches. Continuing with the above example, thus, a suitable value of the label "product" may be assigned to a part or fragment of the search query (e.g., an atom) covered by the match, such as the "ipod," for example, to electronically tag this candidate atom. Similar techniques may be implemented to electronically tag candidate atoms "16 GB," "nano," or the like. Again, claimed subject matter is not limited to these particular patterns or atoms.

In some instances, one or more additional attributes may, for example, be associated or added to a label, such as via operation 204, 206, or any combination thereof. For example, in at least one implementation, one or more Jabba general assignments may be used, at least in part, to facilitate or support adding more details to a label. By way of example but not limitation, the expanded version of the above Jabba rule using a Jabba general assignment to associate or add an additional attribute to a label is illustrated below. Thus, consider, for example:

```
ipod_product = ˜{
    [ ipod iPod i-pod ] 'product:$ˆ; type="electronics"'
    [ nano Nano ]#model
    [ 4GB 8GB 16GB ]?#capacity
    [ sale {for sale} ]?
};
```

As seen, a short-hand notation "$ˆ" may, for example be used, at least in part, to facilitate or support matching any suitable atom covered by a specified match pattern. Here, one or more backtracking operations with respect to one or more callbacks may, for example, be employed, such as to minimize computation. Backtracking may, for example, occur as a suitable machine (e.g., NDFA, etc.) finds one or more matches in an input atom sequence rather than in an action handling (e.g., after one or more matches are found, etc.). For this example, a suitable text string may be extracted using one or more appropriate techniques based, at least in part, on an assigned label (e.g., #product, etc.) with respect to one or more atoms covered by a match (e.g., "ipod," etc), and an additional attribute may be assigned or added to such a label based, at least in part, on a general assignment (e.g., type="electronics"). One or more additional attributes may, for example, be associated with or added to a label in the form of a metadata, just to illustrate one possible implementation. Thus, as seen in the above example, the "product" label on the "ipod" may, for example, include an extra attached attribute of type="electronics" to indicate that the search query may be related to electronic products. This may, for example, be useful for on-line searching in general or for determining contexts of relatively ambiguous search queries (e.g., "Chicago pizza," etc.) in particular, as was also indicated.

As previously mentioned, in at least one implementation, a Jabba-type contextual tagger may, for example, be implemented by compiling one or more Jabba patterns into a state machine (e.g., NDFA, etc.), then for each search query, tokenizing the search query into atoms with class "token" and running one or more token sequences through such a machine. A state machine may make one or more callbacks for each match, for example, with all the match actions. A suitable tagger's callback handler may then create a sequence of labels or tags, for example, whose names are taken from Jabba slot names of a match result, and may add one or more suitable tag attributes for each general assignment, as discussed above. One or more tags or tag attributes may be stored as one or more digital signals in a suitable data repository, such as a tag object comprising a class detected or specified via one or more additional attributes, for example.

Figure 3:
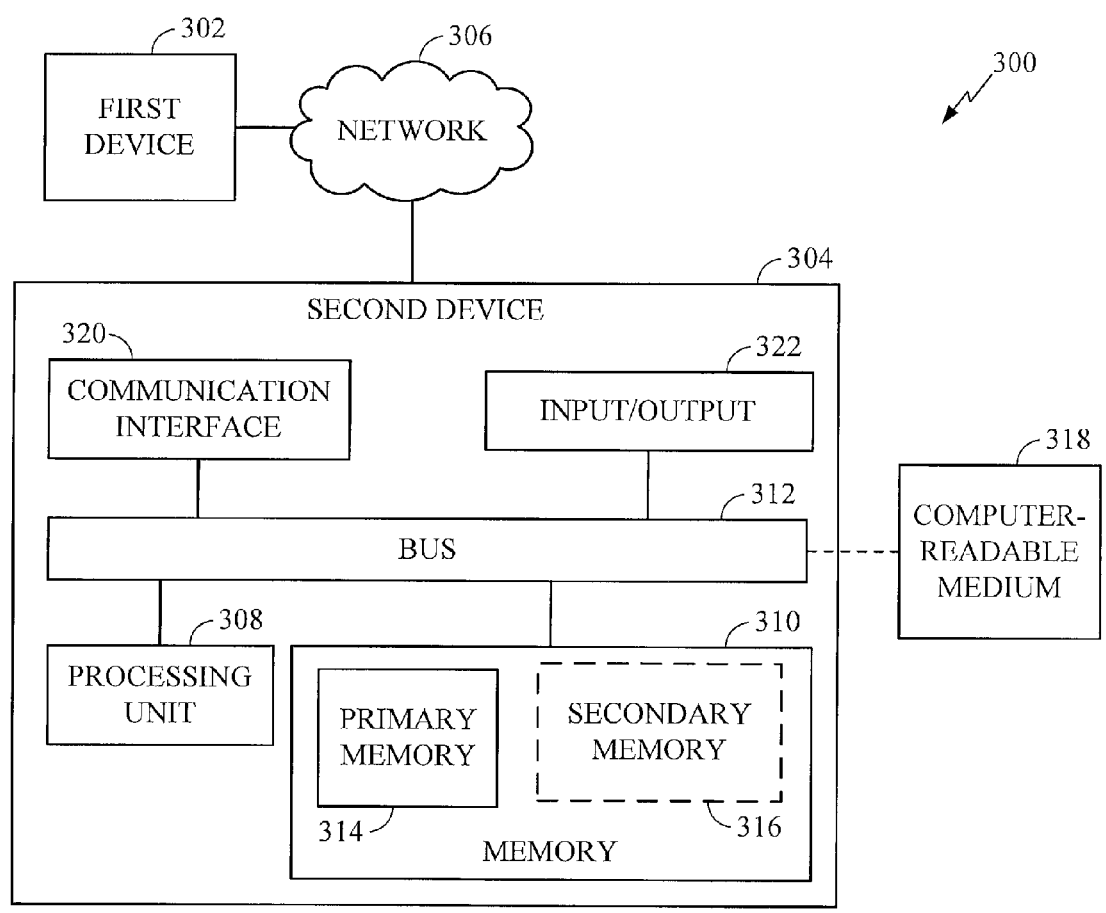
FIG. 3 is a schematic diagram illustrating an implementation of a computing environment associated with one or more special purpose computing apparatuses.

FIG. 3 is a schematic diagram illustrating an example computing environment 300 that may include one or more devices capable of implementing, in whole or in part, one or more processes or operations for a Jabba-type contextual tagger, such as discussed above in connection with FIGS. 1-2, for example. Computing environment system 300 may include, for example, a first device 302 and a second device 304, which may be operatively coupled together via a network 306. In an embodiment, first device 302 and second device 304 may be representative of any electronic device, appliance, or machine that may have capability to exchange content or like signals over network 306. Network 306 may represent one or more communication links, processes, or resources having capability to support exchange or communication of content or like signals between first device 302 and second device 304.

Second device 304 may include at least one processing unit 308 that may be operatively coupled to a memory 310 through a bus 312. Processing unit 308 may represent one or more circuits to perform at least a portion of one or more applicable computing operations or processes. For example, depending on an implementation, processing unit 308 may facilitate or support accessing one or more digital signals representative of a rule defining one or more sequences of candidate atoms, such as in a manner discussed above. In addition, in some instances, processing unit 308 may be capable of generating one or more digital signals representative of one or more labels based, at least in part, on one or more slot actions having at least one slot name associated with a rule. This may, for example, facilitate or support electronically tagging at least one of these candidate atoms with at least one of these one or more labels based, at least in part, on a match with respect to at least one entire sequence of one or more sequences of candidate atoms, as was also discussed.

Memory 310 may represent any signal storage mechanism or appliance. For example, memory 310 may include a primary memory 314 and a secondary memory 316. Primary memory 314 may include, for example, a random access memory, read only memory, etc. In certain implementations, secondary memory 316 may be operatively receptive of, or otherwise have capability to be coupled to a computer-readable medium 318. In some instances, memory 310 or any portion thereof may comprise, for example, a non-transitory memory, as discussed below, and may be used, at least in part, for storing one or more Jabba patterns, tagged attributes, labels, or the like.

Computer-readable medium 318 may include, for example, any medium that may store or provide access to content or like signals, such as, for example, code or instructions for one or more devices in operating environment 300. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of content, in whole or in part, in the form of zeros may change a state to represent content, in whole or in part, as binary digital electrical signals in the form of ones, to illustrate one possible implementation. As such, "non-transitory" may refer, for example, to any medium or device remaining tangible despite this change in state.

Second device 304 may include, for example, a communication adapter or interface 320 that may provide for or otherwise support communicative coupling of second device 304 to a network 306. Second device 304 may include, for example, an input/output device 322. Input/output device 322 may represent one or more devices or features that may be able to accept or otherwise input human or machine instructions, or one or more devices or features that may be able to deliver or otherwise output human or machine instructions.

According to an implementation, one or more portions of an apparatus, such as second device 304, for example, may store one or more binary digital electronic signals representative of content expressed as a particular state of a device such as, for example, second device 304. For example, an electrical binary digital signal representative of content may be "stored" in a portion of memory 310 by affecting or changing a state of particular memory locations, for example, to represent content as binary digital electronic signals in the form of ones or zeros. As such, in a particular implementation of an apparatus, such a change of state of a portion of a memory within a device, such a state of particular memory locations, for example, to store a binary digital electronic signal representative of content constitutes a transformation of a physical thing, for example, memory device 310, to a different state or thing.

Thus, as illustrated in various example implementations or techniques presented herein, in accordance with certain aspects, a method may be provided for use as part of a special purpose computing device or other like machine that accesses digital signals from memory or processes digital signals to establish transformed digital signals which may be stored in memory as part of one or more content files or a database specifying or otherwise associated with a suitable index.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other content storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
   electronically applying a tagging scheme to generate one or more labels with respect to one or more sequences of candidate atoms, said tagging scheme is applied without utilizing one or more machine-learned models, and further comprising:
   accessing one or more digital signals representative of a rule defining said one or more sequences of candidate atoms; and
   generating one or more digital signals representative of said one or more labels based, at least in part, on one or more slot actions specifying said one or more sequences of said candidate atoms via one or more Jabba language constructs or patterns descriptive of one or more named terms corresponding to at least one of the following: a match expression; a sequence; a call; or any combination thereof, and having at least one slot name associated with said rule.

2. The method of claim 1, and further comprising electronically tagging at least one of said candidate atoms with at least one of said one or more labels based, at least in part, on a match with respect to at least one entire sequence of said one or more sequences of said candidate atoms.

3. The method of claim 2, wherein said tagging comprises associating at least one attribute with said at least one of said one or more labels.

4. The method of claim 3, wherein said attribute comprises a string key associated with a JSON-type value.

5. The method of claim 1, wherein at least one of said candidate atoms are associated with at least one of the following: a search query; a structured text accessible over an electronic network; or any combination thereof.

6. The method of claim 1, and further comprising electronically associating at least one additional attribute with said at least one of said one or more labels.

7. The method of claim 1, wherein said one or more labels comprises one or more contextual labels.

8. The method of claim 1, wherein said rule is defined via Jabba language.

9. The method of claim 1, wherein said tagging scheme is applied in connection with a language compiler.

10. The method of claim 9, wherein said language compiler comprises a Jabba language-type compiler.

11. The method of claim 1, wherein said tagging scheme is applied in connection at least one tokenization operation with respect to a search query.

12. The method of claim 11, wherein said at least one tokenization operation comprises transforming said search query into at least one of the following: at least one of said candidate atoms; said one or more sequences of said candidate atoms; or any combination thereof.

13. The method of claim 1, wherein said one or more digital signals representative of said rule is associated with at least one of the following: a data file internal to a language compiler; a data file external to a language compiler; or any combination thereof.

14. An apparatus comprising:
a computing platform comprising at least one processor to:
electronically apply a tagging scheme to generate one or more labels with respect to one or more sequences of candidate atoms, said tagging scheme is to be applied without a utilization of one or more machine-learned models, wherein said at least one processor further to:
access one or more digital signals to represent a rule to define said one or more sequences of candidate atoms; and
generate one or more digital signals to represent said one or more labels to be based, at least in part, on one or more slot actions to specify said one or more sequences of said candidate atoms via one or more Jabba language constructs or patterns descriptive of one or more named terms corresponding to at least one of the following: a match expression; a sequence; a call; or any combination thereof, and to have at least one slot name associated with said rule.

15. The apparatus of claim 14, wherein said at least one processor further to electronically tag at least one of said candidate atoms with at least one of said one or more labels to be based, at least in part, on a match with respect to at least one entire sequence of said one or more sequences of candidate atoms.

16. The apparatus of claim 14, wherein said at least one processor further to electronically associate at least one additional attribute with said at least one of said one or more labels.

17. An article comprising:
a non-transitory storage medium having instructions stored thereon executable by a special purpose computing platform to:
electronically apply a tagging scheme to generate one or more labels with respect to one or more sequences of candidate atoms, said tagging scheme is to be applied without a utilization of one or more machine-learned models, wherein said instructions further to:
access one or more digital signals to represent a rule to define said one or more sequences of candidate atoms; and
generate one or more digital signals to represent said one or more labels to be based, at least in part, on one or more slot actions to specify said one or more sequences of said candidate atoms via one or more Jabba language constructs or patterns descriptive of one or more named terms corresponding to at least one of the following: a match expression; a sequence; a call; or any combination thereof, and to have at least one slot name associated with said rule.

18. The article of claim 17, wherein said non-transitory storage medium further includes instructions to electronically tag at least one of said candidate atoms with at least one of said one or more labels to be based, at least in part, on a match with respect to at least one entire sequence of said one or more sequences of candidate atoms.

19. The article of claim 17, wherein said non-transitory storage medium further includes instructions to electronically associate at least one additional attribute with said at least one of said one or more labels.

* * * * *